United States Patent [19]

Hunt et al.

[11] Patent Number: 4,589,621
[45] Date of Patent: May 20, 1986

[54] ERGONOMIC MONITOR STAND

[75] Inventors: Ronald E. Hunt, Georgetown; Verlon E. Whitehead, Austin, both of Tex.

[73] Assignee: International Business Machines Corporation, Armonk, N.Y.

[21] Appl. No.: 567,702

[22] Filed: Jan. 3, 1984

[51] Int. Cl.[4] .......................................... F16M 13/00
[52] U.S. Cl. .................................. 248/586; 254/126; 248/421
[58] Field of Search .............. 248/586, 585, 587, 588, 248/590, 591, 421, 354.1, 352; 254/126, 122

[56] References Cited

U.S. PATENT DOCUMENTS

| 1,658,188 | 2/1928 | Embury . | |
|---|---|---|---|
| 1,893,295 | 1/1933 | Bailly | 248/586 |
| 2,227,764 | 1/1941 | Saunders et al. . | |
| 2,513,440 | 7/1950 | Alderson . | |
| 2,545,515 | 3/1951 | Gannett et al. . | |
| 2,805,905 | 9/1957 | Levitan et al. | 248/421 |
| 3,741,512 | 6/1973 | Olsson | 248/585 |
| 3,857,548 | 12/1974 | Takeuchi | 254/126 |
| 4,025,054 | 5/1977 | Yamazaki | 254/126 |
| 4,047,759 | 9/1977 | Koscinski | 248/587 |
| 4,055,329 | 10/1977 | Hammond | 254/126 |
| 4,304,385 | 12/1981 | Farouche et al. | 248/410 |
| 4,305,563 | 12/1981 | Presson | 248/349 |
| 4,365,779 | 12/1982 | Bates et al. | 248/371 |
| 4,368,867 | 1/1983 | Pendelton | 248/346 |
| 4,372,515 | 2/1983 | Glumac | 248/178 |

FOREIGN PATENT DOCUMENTS

| 3036852 | 5/1982 | Fed. Rep. of Germany . |
|---|---|---|
| 363116 | 4/1929 | France . |
| 0010491 | 4/1980 | France . |

Primary Examiner—Ramon S. Britts
Assistant Examiner—Ramon O. Ramirez
Attorney, Agent, or Firm—Andrea P. Bryant

[57] ABSTRACT

A stand (10) is disclosed for supporting a computer display (8) workstation for easy adjustment without tools to a desired position by rotating the stand, tilting a platform (60) attached to the stand and lifting the stand. The stand comprises a six bar (20, 22, 16, 30, 32, 54) pivotable linkage having spring (44, 48, 52) means for compensating for the load, the spring force being adjustable to accommodate changes in load without affecting the spring rate.

6 Claims, 6 Drawing Figures

ERGONOMIC MONITOR STAND

TECHNICAL FIELD

This invention relates to computer visual display workstation stands. More particularly, it relates to a stand capable of allowing a visual display workstation to be easily, and with minimum operator effort, tilted, rotated, raised and lowered.

BACKGROUND ART

With the proliferation of computer devices for use in the home, school and office more and more people are required to spend time in front of a display monitor. It is better for persons using display monitors if they are positionable in sufficient dimensions to allow the person to maintain a comfortable posture. It is often true that a given display monitor is used at different times by people of widely varying height and posture preferences. Thus, it is further desirable to be able to easily change the position of the display monitor to accommodate the personal preference of a particular user. Many attempts have been made to solve the problem of comfortably positioning a display station.

U.S. Pat. No. 4,305,385 to Farouche et al describes a tilt, swivel and vertical control mechanism to be provided between a display device and a stable base.

U.S. Pat. No. 4,305,563 to Presson teaches a computer terminal means for both the keyboard and display station. The display station may be rotated.

U.S. Pat. No. 4,368,867 to Pendleton et al relates to a tilt base for a CRT display terminal.

U.S. Pat. No. 4,472,515 to Noonan et al teaches a CRT housing support with a rocking tilt adjustment provided.

U.S. Pat. No. 4,365,779 to Bates et al describes an apparatus permitting and limiting the extent of tilt and rotation of a display monitor.

U.S. Pat. No. 1,658,188 to Embury describes a flashlight stand comprising lazy tongs which are pivotally connected to a casing holding the flashlight.

U.S. Pat. No. 2,545,515 to Gannett et al describes a vertically adjustable table for office appliances arranged to operate easily with relatively little force applied directly to the table top. Means are provided for compensating for variation in the weight of load being carried. The table top is supported by means of a plurality of arms pivotally connected therebetween and so positioned as to form the sides of spaced parallelograms. Coiled tension springs counterbalance the weight of the table top and any load placed thereon.

U.S. Pat. No. 2,227,764 to Saunders et al teaches an adjustable seat support including a pair of devices comprising front and rear articulated assemblies pivotally mounted upon and near the ends of a longitudinally extending rail. Angular movement of the link sections with relation to each other about their central pivots is prevented by means of sector gears meshable with and being rolled over by other gears. When these other gears roll over the link assumes any desired angular position relative to the first sector gears.

U.S. Pat. No. 2,513,440 to Alderson describes a wheel lifting mechanism for heavy furniture. The device includes connecting links together with other members to which they are connected forming a parallelogram pivotable at its corners. There is an over center relationship of each arm and link maintained by having connected therebetween relatively strong coil springs.

DISCLOSURE OF INVENTION

The present invention provides a cost-effective solution to the widespread and growing problem of making video display monitors or workstations easily adjustable. Our apparatus includes a weight compensating stand, comprising two pairs of arms. Within each pair of arms there is a pivotal connection at one end of the arms to the other of its pair. The other end of each arm terminates in a pair of sector gears. The two sets of sector gears are arranged in meshing contact. Where one of the sets of sector gears meet, a limitedly pivotable platform for supporting the workstation is connected. A rotatably supported base is connected to the stand where the other set of sector gears mesh. A torsion spring connected to each pair of arms is used to compensate for the load of the workstation. Means for adjusting the pair of coil springs is provided at the base. A single extension spring provides additional counterbalance for the weight of the workstation and is connected between the two pairs of arms.

BRIEF DESCRIPTION OF DRAWING

The above and other advantages will become apparent from the following more detailed description of the invention taken in connection with the accompanying drawing wherein the same reference numerals refer to the same parts throughout and in which.

BEST MODE FOR CARRYING OUT THE INVENTION

Figure 1:
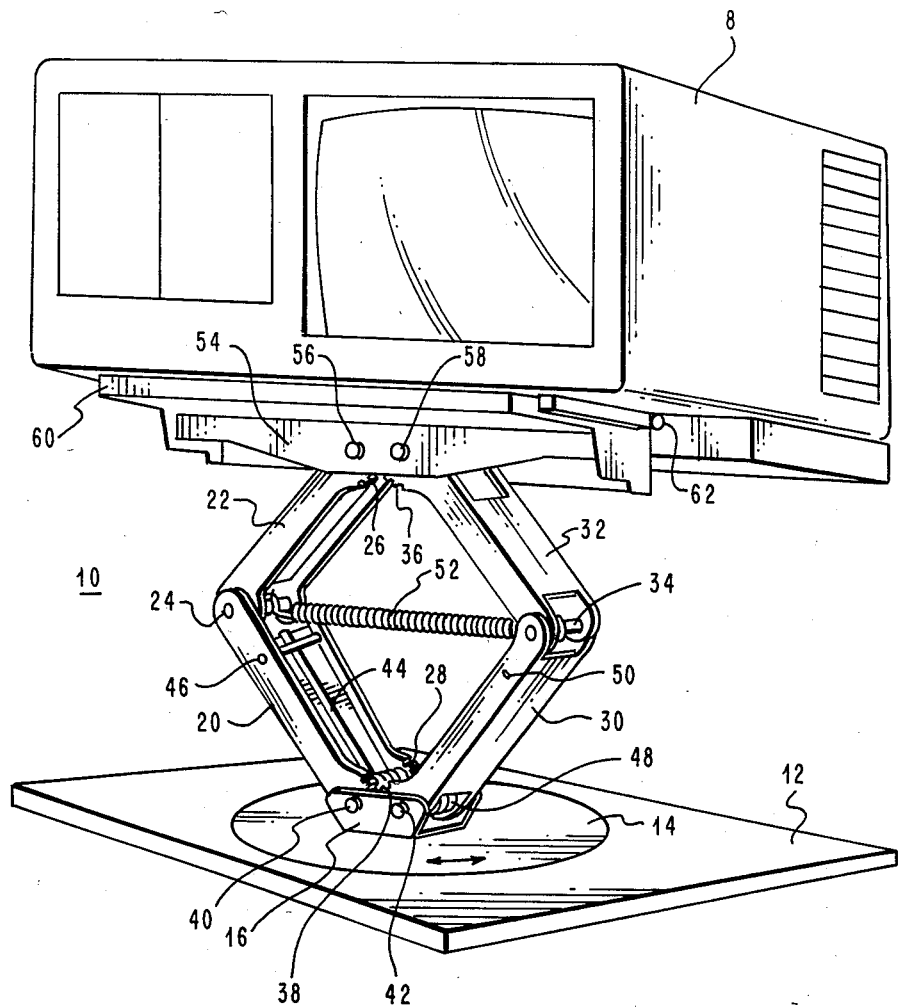
FIG. 1 shows a workstation supported on a stand in accordance with the present invention.

Refer now to FIG. 1 which shows a computer workstation device 8 attached to a stand 10 in accordance with the present invention. The stand generally indicated at 10 is rotatably mounted in table surface 12 by means of revolving base 14. Revolving base 14 may revolve using a lazy susan type mechanism or be suitably mounted in bearings within table top 12. Stand 10 is fixedly attached to revolving stage 14 by bracket 16.

The stand 10 which provides the ergonomic qualities of the present invention is made up of four arm segments 20 and 22, 30 and 32 each of which is generally U-shaped in cross section. Each arm segment is adapted for pivotal connection to another arm at one end; and the other end terminates in a pair of sector gears adapted to engage the sector gears terminating another arm. In the figure, arm 20 is pivotally connected to arm 22 by rod 24. Similarly, arm 30 is pivotally connected to arm 32 by rod 34. Arm 22 terminates in sector gears 26 while arm 20 terminates in sector gears 28. Similarly, arm 30 terminates in sector gears 38 and arm 32 terminates in sector gears 36.

Arm 20 is pivotally connected to bracket 16 by rod 40. Similarly, arm 30 is connected to bracket 16 by rod 42. Coil spring 44 is wrapped about rod 40 and is retained in arm 20 by rod 46, coil spring 48 is wrapped about rod 42 and retained in arm 30 by rod 50. Extension spring 52 is connected at either end to pivot rods 24 and 34.

Spring biased arms 20 and 22, 30 and 32 together make up the lifting mechanism of the workstation stand. The lifting mechanism is connected to upper bracket 54. Arm 22 is connected pivotally by rod 56; and rod 58 connects arm 32 to upper bracket 54. Upper bracket 54 is connected to platform 60 which is adapted for limited pivotal movement about an axis passing through rod 62.

Figure 2:
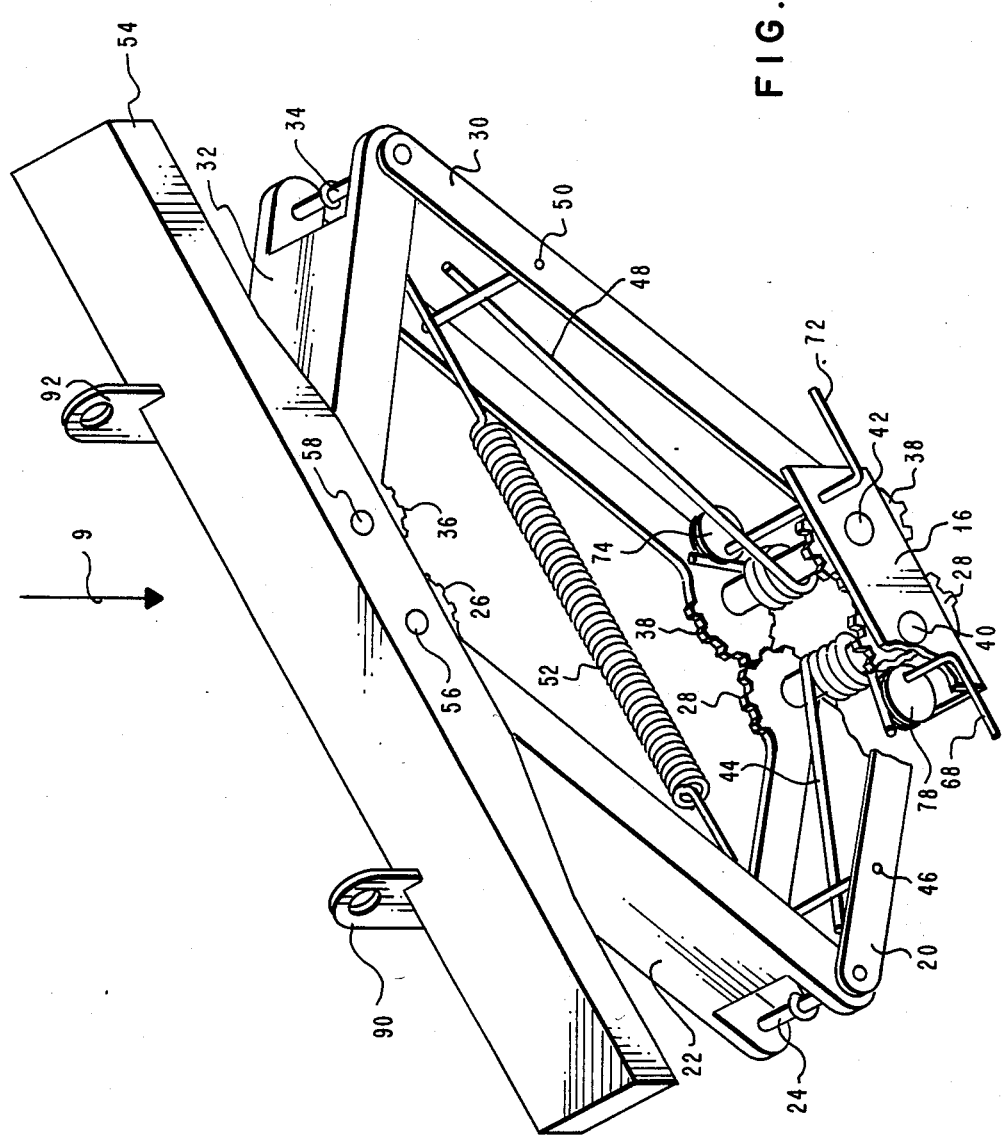
FIG. 2 is an enlarged detail of the structural elements and connections of the lifting mechanism.

Refer now to FIG. 2 which is a partially cut away view of the lift mechanism portion of the ergonomic workstation stand which permits a better understanding of the load compensating aspect of the invention. Upper bracket 54 includes connector brackets 90 and 92, used in attaching pivot platform 60 (FIG. 1). Springs 44, 48 and 52 are provided to make stand 10 weight compensating for the load exerted by the workstation. It is desirable that a small force (approximately 5 pounds) be all that is necessary for the operator to apply to effect tilt, rotate or lift of the workstation. Coil springs 44 and 48 are torsion springs specifically provided to compensate for the downward load indicated by the arrow 9. Means for adjusting the tension of springs 44 and 48 are provided. Coil spring 44 is adjustable by handle 68 which is fixedly attached to grooved cam 70. One end of spring 44 is engaged in a groove the periphery of cam 70. Rotation of handle 68 increases or decreases the pre-tension in spring 44, the other end of which is retained by rod 46. Handle 72 provides a similar adjustment for spring 48 by using grooved cam 74 to move the free end of spring 48, the other end of which is retained against arm 30 by retaining rod 50. Extension spring 52 along with springs 44 and 48 provides the flat rate counterbalancing force to support the load of the workstation. Springs 44 and 48 exert a pull up force on the lift mechanism. Additional springs similar to 44 and 48 may be added to arms 22 and 32 if the load of the workstation to be supported so requires.

The springs shown, 44, 48 and 52 provide frictional loading on pivot rods 24, 34, 40, 42, 56 and 58 sufficient to ensure frictional detent in any vertical position selected. This hysteretical characteristic of our apparatus further improves the ergonomics of the device since no special tools or actions other than a push down or upward lift on the workstation (FIG. 1) is required to set the desired height thereof.

Figure 3:
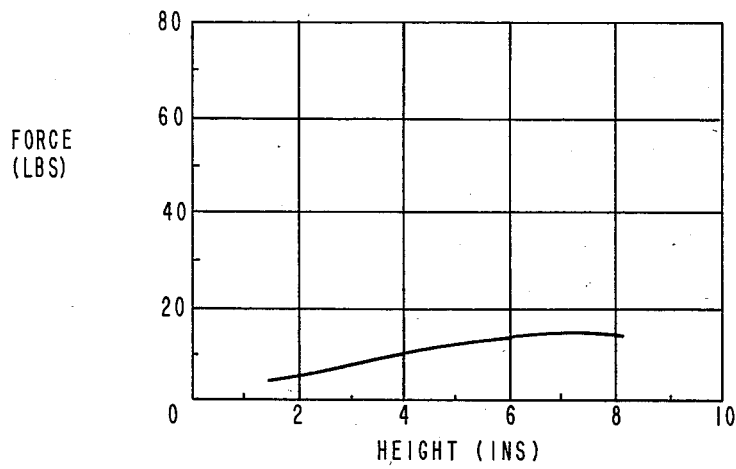
FIG. 3 graphically illustrates the lifting force curve for the extension spring.

FIG. 3 is a graphic representation of the force exerted on the tension spring 52 (FIG. 2) plotted as a function of the change in height of the workstation. It is to be noticed that the curve has a positive slope.

Figure 4:
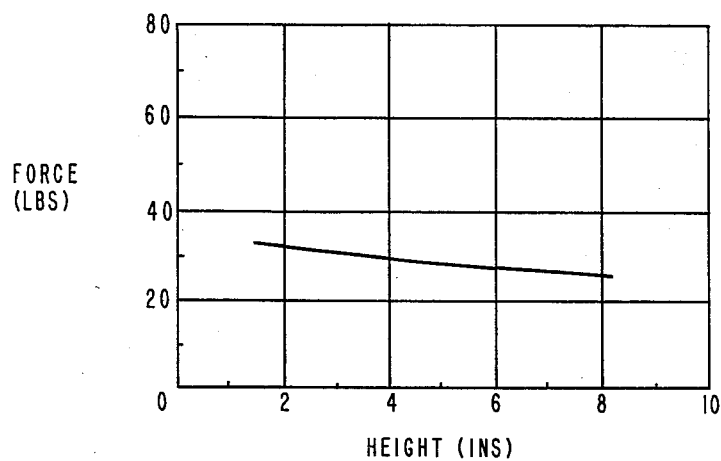
FIG. 4 illustrates the torsion spring lift force.

FIG. 4 is a graphic representation of the force exerted by the torsion springs 44 and 48 as a function of the height of the workstation. This slope has an overall negative slope.

Figure 5:
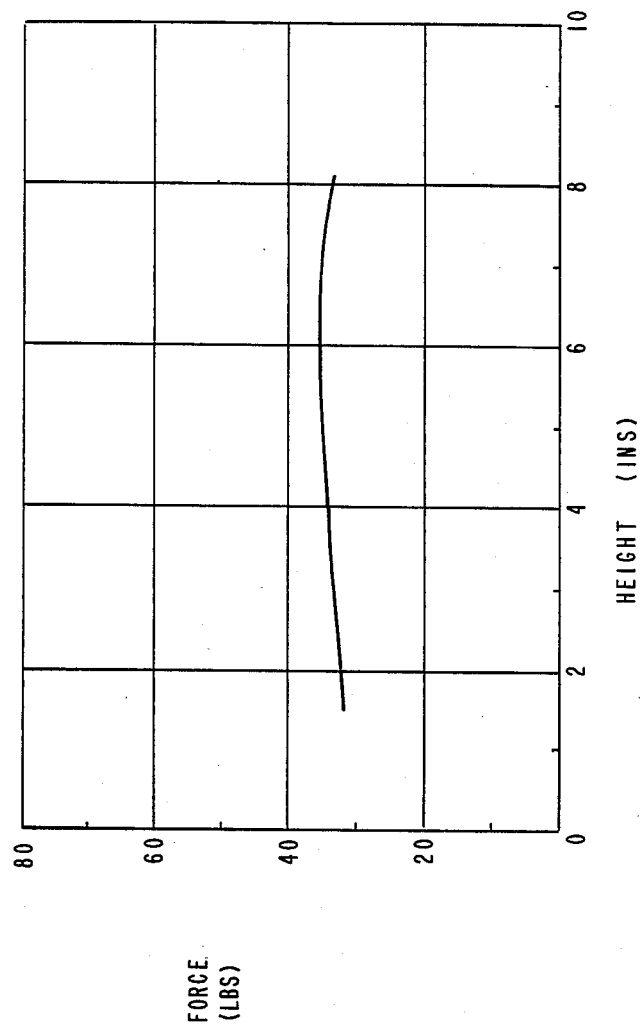
FIG. 5 is a composite illustrating the total lifting force of the extension and torsion springs plotted against the height of the stand.

FIG. 5 is a composite of FIGS. 3 and 4 and illustrates that the total lifting force required of both the extension spring 52 and coiled torsion springs 44 and 48. The curve has a slope that is virtually horizontal. Thus, the work required to move the stand to any desired height is relatively minimal. The meshing sector gears 26 and 36, 28 and 38 provide equal angular, smooth motion to both (20, 22 and 30, 32) sides of stand 10 when it is lifted or lowered. The angle θ between the horizontal and arm 22 or 30 is equal since the segment gears have matching pitch.

Figure 6:
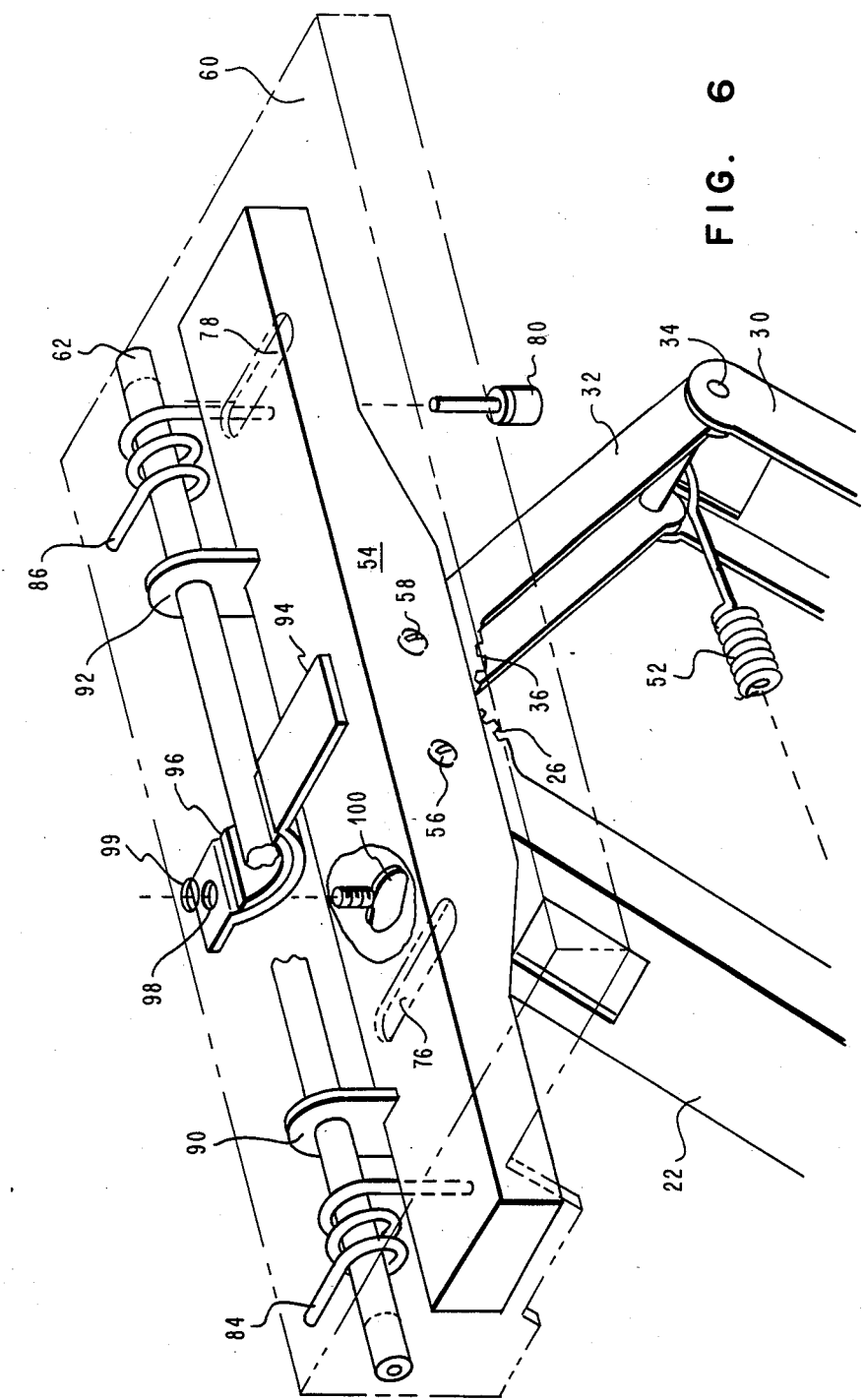
FIG. 6 shows the means for pivoting a workstation supported by a stand in accordance with the present invention.

Refer now to FIG. 6. Holes or slots 76 and 78 in platform 60 are adapted for mating positioning with tapped holes in the workstation base. A connector device such as that illustrated at 80 may be used to attach platform 60 and the workstation to be supported. Coil springs 84 and 86 are wrapped about rod 62, each having one end grounded against bracket 54 and the other end urged upwardly against the underside of platform 60. Springs 84 and 86 limit the amount of pivoting motion possible by platform 60. Rod 62 is fixedly attached to blocks 90 and 92 connected to upper bracket 54.

A bracket 94 adapted to transversely cradle rod 62 is provided on the underside of platform 60. One end of bracket 54 is fixedly attached to the underside of platform 60. The section of bracket 94 which cradles rod 62 is lined with a pad 96 of friction material in contact with rod 62. The free end of bracket 94 has a hole 98 therein which is adapted to receive a thumbscrew 100. Hole 99 is tapped in platform 60. Tightening thumbscrew 100 increases the contact pressure of friction pad 96 against rod 62. This action further restrains the amount of pivot available to platform 60. Obviously the configuration of platform 60 is chosen as required by the workstation base configuration for attachment thereto.

While the invention has been described having reference to a particular embodiment it is of course obvious to those skilled in the art that above mentioned and other changes in form and detail may be made without departing from the spirit and scope of the invention.

We claim:

1. A variably positionable support stand for computer work station having a base comprising:
   a platform adapted for limited pivotal motion, attached to the base of the workstation;
   a six bar linkage connected at one side to the platform, said linkage including selectively adjustable upward force exerting spring means for compensating for the downward force exerted by the workstation,
   said spring means comprising coil springs each having one end thereof attached to a lower member of the six bar linkage and the other end thereof engaged in a manually alterable tension adjuster; and
   a rotatable base connected to a side of the linkage opposite the side connected to the platform.

2. The stand of claim 1 wherein the six bar linkage comprises:
   a pair of mirror image pivotally connected two bar linkages adapted to meshingly engage at their free upper and lower ends in sector gears, pivotally mounted in parallel brackets.

3. The stand of claim 2 wherein:
   the platform is attached to the bracket connecting the engaged upper sector gears of the pair of two-bar linkages; and
   the rotatable base is connected to the six bar linkage by means of the bracket connecting the lower engaged sector gears.

4. An ergonomic, mechanically hysteretical workstation support including:
   a lower pair of links having their lower ends gearingly engaged;
   an upper pair of links having their upper ends gearingly engaged;

pivot means connecting the upper ends of the lower pair of links and the lower ends of the upper pair of links;

rotating base means connected to the gearingly engaged lower ends of the lower pair of links;

first bracket means connected to the gearingly engaged lower ends of the lower pair of links;

second bracket means connected to the gearingly engaged upper ends of the upper pair of links;

pivotable platform means connected to the bracket first bracket means;

spring means of selectively variable force located in said lower pair of links for urging said pivotally connected lower pair and upper pair of links vertically upward from the rotating base means, said spring means comprising coil springs each having one end thereof connected with one of said lower pair of links and the other end thereof connected to said first bracket means; and adjustment means in said first bracket means for varying the force in the coil springs.

5. An easily adjustable support for a computer workstation comprising:

a base bracket mounted for rotation in a horizontal plane;

vertically adjustable means connected to the base bracket said vertically adjustable means comprising a mechanically hysteretical system comprising:

two sets of two pivotally joined arms, having their free ends terminating in gear teeth of equal pitch, said arms being arranged to have their free ends in meshing engagement with the corresponding free ends of the other arms;

variably tensionable spring means connected to at least one arm of each set of arms for compensating for the weight of the workstation;

lower pivot means connecting one set of meshingly engaged arm end to the base bracket; and upper pivot means connecting the other set of meshingly engaged arm ends to the upper bracket;

an upper bracket connected to said vertically adjustable means; and pivotally movable platform means connected to said upper bracket said platform being pivotable about an axis parallel to said base, and adapted to receive a workstation.

6. Improved apparatus for enabling a computer workstation to be tilted, rotated, raised or lowered comprising:

an upper frame member for engaging the bottom portion of the workstation and adapted for limited pivotal movement;

a lower frame member adapted for rotation;

a four bar linkage connected between the upper and lower frame members;

biasing means connected to the four bar linkage for urging the four bar linkage upwardly for counterbalancing the load exerted by the workstation;

means for selectively adjusting the biasing means for compensating for changes in workstation load; and fixed rate spring means connected across the four bar linkage for cooperating with the biasing means.

* * * * *

UNITED STATES PATENT AND TRADEMARK OFFICE
CERTIFICATE OF CORRECTION

PATENT NO. : 4,589,621
DATED : May 20, 1986
INVENTOR(S) : R. E. Hunt et al

It is certified that error appears in the above—identified patent and that said Letters Patent is hereby corrected as shown below:

Column 1, line 26, "4,305,385" should read --4,304,385--.

Column 6, line 7, "end" should read --ends--.

Signed and Sealed this

Seventeenth Day of November, 1987

Attest:

DONALD J. QUIGG

*Attesting Officer*   *Commissioner of Patents and Trademarks*